United States Patent
Greenberger et al.

(12) 
(10) Patent No.: US 10,531,334 B2
(45) Date of Patent: Jan. 7, 2020

(54) DETERMINING A TRANSMISSION NUMBER FOR A DEVICE

(71) Applicant: International Business Machines Corporation, Armonk, NY (US)

(72) Inventors: Jeremy A. Greenberger, Raleigh, NC (US); Ciaran E. Hannigan, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/194,595

(22) Filed: Jun. 28, 2016

(65) Prior Publication Data

US 2017/0374495 A1 Dec. 28, 2017

(51) Int. Cl.
*H04W 28/08* (2009.01)
*H04W 40/24* (2009.01)
*H04W 4/80* (2018.01)

(52) U.S. Cl.
CPC ............ *H04W 28/08* (2013.01); *H04W 4/80* (2018.02); *H04W 40/244* (2013.01)

(58) Field of Classification Search
CPC ... H04W 28/08; H04W 40/244; H04W 4/008; H04W 4/80
See application file for complete search history.

(56) References Cited

U.S. PATENT DOCUMENTS

| | | | |
|---|---|---|---|
| 6,460,018 B1 | 10/2002 | Kasai et al. | |
| 6,885,868 B1* | 4/2005 | Naim | H04L 47/10 455/435.3 |
| 6,895,005 B1* | 5/2005 | Malin | H04L 47/10 370/389 |
| 6,963,747 B1* | 11/2005 | Elliott | H04W 72/1231 370/222 |
| 7,382,476 B1 | 3/2008 | Maemura | |
| 7,852,855 B1* | 12/2010 | Gooding | H04B 7/18584 370/237 |
| 8,169,998 B2 | 5/2012 | Fischer et al. | |
| 8,185,125 B2 | 5/2012 | Goto et al. | |
| 8,279,895 B2 | 10/2012 | Cordeiro et al. | |
| 8,768,418 B2 | 7/2014 | Ho et al. | |
| 8,774,846 B2 | 7/2014 | Laroia et al. | |
| 8,781,502 B1* | 7/2014 | Middleton | G06Q 30/0261 455/456.3 |
| 8,804,677 B2 | 8/2014 | Corson et al. | |
| 9,055,389 B2 | 6/2015 | Miklos et al. | |
| 2001/0043613 A1* | 11/2001 | Wibowo | H04J 3/1682 370/468 |

(Continued)

OTHER PUBLICATIONS

Dictionary definition of "Balance", located at https://www.dictionary.com/browse/balance?s=t, retrieved on Aug. 10, 2018.*

(Continued)

*Primary Examiner* — Gennadiy Tsvey
(74) *Attorney, Agent, or Firm* — Michael D. Purdham (57) ABSTRACT

A set of rules for assigning a transmission number to one or more computing devices is received. An indication from a first computing device is received. The indication includes a request for a transmission number. The transmission number for the first computing device is determined using the set of rules and a transmission window. The transmission number is transmitted to the first computing device.

19 Claims, 4 Drawing Sheets

(56) References Cited

U.S. PATENT DOCUMENTS

| | | | | |
|---|---|---|---|---|
| 2005/0025093 | A1* | 2/2005 | Yun | H04W 76/10 |
| | | | | 370/328 |
| 2007/0263702 | A1* | 11/2007 | Kwon | H04B 1/713 |
| | | | | 375/135 |
| 2009/0073954 | A1* | 3/2009 | Maltsev | H04W 72/082 |
| | | | | 370/347 |
| 2011/0009126 | A1* | 1/2011 | Lee | H04W 28/08 |
| | | | | 455/453 |
| 2011/0158194 | A1* | 6/2011 | Musikka | H04L 5/0016 |
| | | | | 370/329 |
| 2013/0094536 | A1 | 4/2013 | Hui et al. | |
| 2013/0279334 | A1* | 10/2013 | Xu | H04W 24/04 |
| | | | | 370/235 |
| 2014/0051379 | A1* | 2/2014 | Ganesh | H04M 1/72538 |
| | | | | 455/404.1 |
| 2015/0002311 | A1 | 1/2015 | Spiess | |
| 2015/0052485 | A1 | 2/2015 | Grounds et al. | |
| 2015/0078230 | A1 | 3/2015 | Choi et al. | |
| 2015/0098420 | A1 | 4/2015 | Luo et al. | |
| 2015/0230170 | A1* | 8/2015 | Jeong | H04W 74/04 |
| | | | | 370/311 |
| 2015/0230208 | A1 | 8/2015 | Ukita et al. | |
| 2016/0021500 | A1 | 1/2016 | Won | |
| 2016/0029161 | A1 | 1/2016 | Park et al. | |
| 2016/0037439 | A1 | 2/2016 | Shamis et al. | |
| 2016/0286465 | A1* | 9/2016 | Wu | H04W 48/08 |
| 2018/0020365 | A1* | 1/2018 | Xiong | H04W 74/0833 |
| 2018/0092017 | A1* | 3/2018 | Freda | H04W 76/14 |

OTHER PUBLICATIONS

Hindy, Joe, "Digital Insurance Card—Indie app of the day", AndroidAuthority, Sep. 2, 2014, 15 pages, <http://www.androidauthority.com/digital-insurance-card-review-5184 72/>.

Levy, Marc, "Increasing Throughput with Horizontal Scaling and Batching", Jul. 2012, Copyright 2016, Amazon Web Services, Inc., 8 pages, <http://docs.aws.amazon.comIAWSSimpleQueueService/latest/SQSDeveloperGuide/throughput.html>.

Mell et al., "The NIST Definition of Cloud Computing", Recommendations of the National Institute of Standards and Technology, NIST Special Publication 800-145, Sep. 2011, 7 pages.

Varghese et al., "Dynamic Beacon based and Load Balanced Geo Routing in MANETs", International Conference on Communication and Signal Processing, Apr. 3-5, 2014, India, 978-1-4799-3358-7114, © 2014 IEEE, pp. 682-686.

Yoneya et al., "Two Novel Handover Algorithms with Load Balancing for Heterogeneous Network", Dept. of Communication Engineering, Graduate School of Engineering, Tohoku University, Sendai, Japan, 978-1-4799-8091-8/15, © 2015 IEEE, 5 pages.

"Core Bluetooth Background Processing for iOS Apps", Copyright © 2013 Apple Inc., Updated: Sep. 18, 2013, 10 pages, <https://developer.apple.com/library/ios/documentation/NetworkingInternetWeb/Conceptual/Co>.

"Global Load Balancing", What is Global Load Balancing?, Global Load Balancing & Geo Targeting I Incapsula, Copyright 2016 Imperva, Printed Apr. 5, 2016, 7 pages, <https://www.incapsula.com/load-balancing/global-server-load-balancing-gslb.html>.

"On-board diagnostics", Wikipedia, the free encyclopedia, Last modified on Apr. 2, 2016, at 15:19, Printed Apr. 5, 2016, 17 pages, <https://en.wikipedia.org/wiki/On-board_diagnostics>.

"Technoton Fuel Monitoring", Fuel monitoring & Vehicle tracking systems in India: Technoton Sensors Ltd., © Technoton Sensors India, 2011-2015, Printed Apr. 5, 2016, 6 pages, <http://technoton.in/>.

"Solution Brief: Machine Monitoring Applications in the Oil and Gas Industry (/Applications/Solution-Brief-Machine-Monitoring-Applications-Oil-and-Gas-Industry)", Vehicle Health Monitoring, International Distributors (/Support/Distributors), vehicle-health-monitoring | Lord Sensing Systems, Copyright 2016, Printed Apr. 5, 2016, 5 pages, <http://www.microstrain.com/applications/vehicle-health-monitoring>.

"Vehicle Health Monitoring System", Vehicle Health Monitoring System—Aeron Systems, Printed Apr. 5, 2016, 3 pages, <http://www.aeronsystems.com/products/m2m-devices/vehicle-health-monitoring-system/>.

IBM Appendix P, list of patents and patent applications treated as related, Jun. 28, 2016, 2 pages.

Greenberger et al., "Transmitting Notifications Using a Transmission Number", U.S. Appl. No. 15/194,592, filed Jun. 28, 2016, 39 pages.

* cited by examiner

DETERMINING A TRANSMISSION NUMBER FOR A DEVICE

BACKGROUND

The present invention relates generally to the field of Bluetooth™ beacons, and more particularly to load balancing network requests from a beacon on a computing device.

In computing, a wireless personal area network (WPAN) is a low-powered personal area network carried over a short-distance wireless network. The WPAN range may vary from a few centimeters to a few meters. The WPAN may serve to interconnect any number of ordinary computing and communication devices that many people carry around with them or have located in their home, office, etc. The WPAN may use short-distance technology such as Bluetooth™.

SUMMARY OF THE INVENTION

Embodiments of the present invention include a method, computer program product, and system for the load balancing of transmissions from any number of computing devices found in a physical environment. In one embodiment, a set of rules for assigning a transmission number to one or more computing devices is received. An indication from a first computing device is received. The indication includes a request for a transmission number. The transmission number for the first computing device is determined using the set of rules and a transmission window. The transmission number is transmitted to the first computing device. An advantage of this method, computer program product, and system is that devices are given a transmission number based on a set of rules and the transmission window. Each transmission number does not become overloaded with too many devices compared to another transmission number. This allows the server device to not become overloaded receiving notifications because computing devices can only transmit notifications to the server device during the computing devices assigned transmission window.

In yet another aspect, a method, a computer program product, and system are provide that allow for determining whether to update the transmission number for the first device based on the set of rules. Responsive to determining to update the transmission number for the first device based on the set of rules, the transmission number is updated for the first computing device using the set of rules and the transmission window. The updated transmission number is transmitted to the first computing device. An advantage of this method, computer program product, and system is that, when a transmission number has too many or too few computing devices assigned to it based on the rules, which would cause one transmission number to become more overloaded than another, the transmission numbers can be updated and transmitted to the devices so that the server can most optimally handle the notifications being received from the computing devices.

DETAILED DESCRIPTION

Embodiments of the present invention provide for receiving rules for determining a transmission number to assign to computing devices that may be found in a physical environment. Embodiments of the present invention provide for receiving an indication from a computing device. Embodiments of the present invention provide for determining a transmission number for the computing device based on the rules. Embodiments of the present invention provide for transmitting the transmission number to the computing device. Embodiments of the present invention provide for updating the transmission number based on changes to the physical environment. Embodiments of the present invention provide for transmitting the updated transmission number to the computing device.

Embodiments of the present invention provide for a computing device requesting a transmission number. Embodiments of the present invention provide for a computing device receiving a transmission number. Embodiments of the present invention provide for receiving a notification from a beacon. Embodiments of the present invention provide for determining whether to transmit the notification based on the received transmission number. Embodiments of the present invention provide for adding the notification to a batch of notifications not yet transmitted if it is not the current transmission number. Embodiment of the present invention provide for transmitting the notification or a batch of notification if it is the current transmission number.

Embodiments of the present invention recognize that beacons (i.e. Bluetooth™ Low Energy Devices) are a popular means for providing enhanced experiences for customers of venues, such as stadiums, airports, retail stores and hospitals. Embodiments of the present invention recognize that these devices have a disadvantage when it comes to consuming large amounts of resources on the receiving end of the server devices managing the handling the notifications. Embodiments of the present invention recognize that these devices have a disadvantage when it comes to consuming large amounts of battery power on the user device end when communication with the server device managing notifications.

The present invention will now be described in detail with reference to the Figures.

Figure 1:
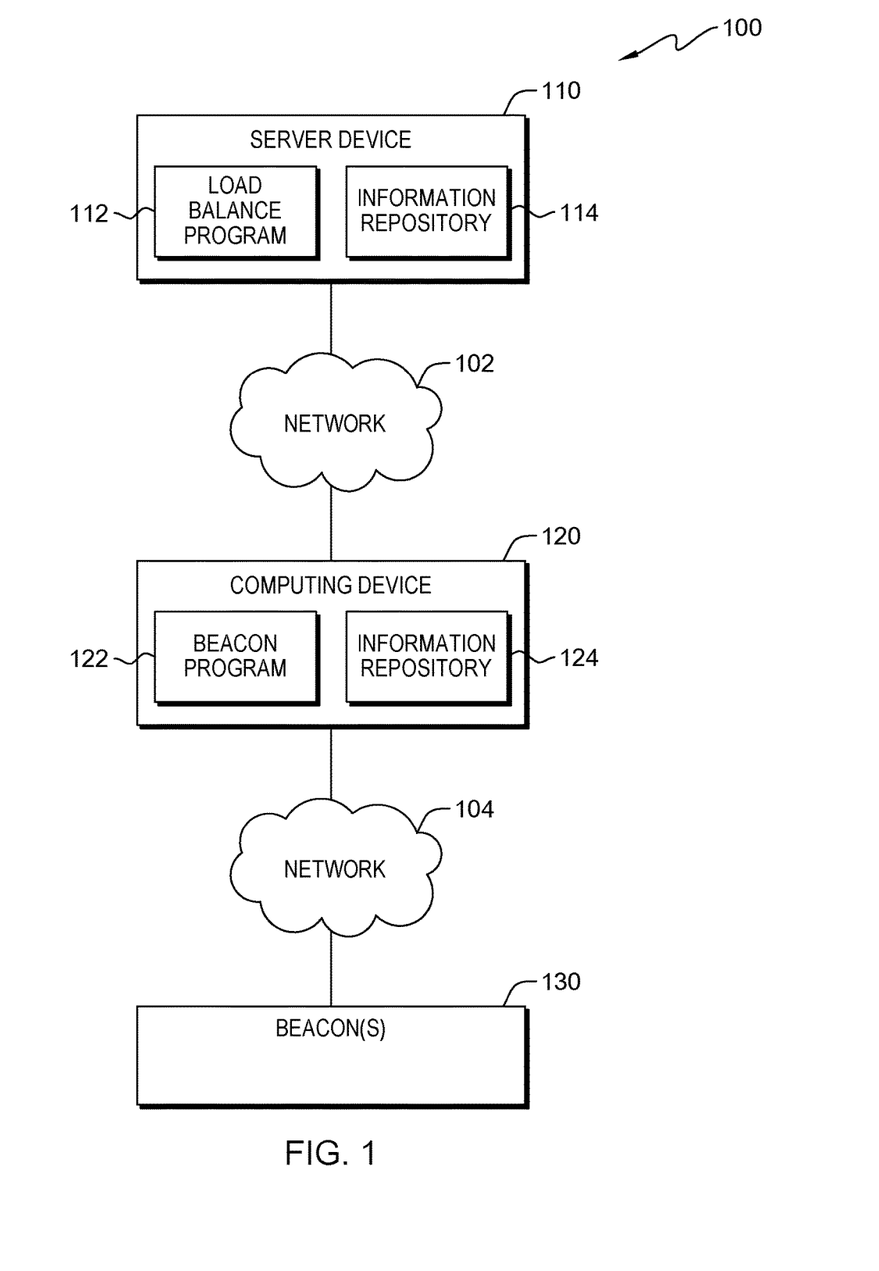
FIG. 1 depicts a functional block diagram of a data processing environment, in accordance with an embodiment of the present invention.

FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes server device 110, computing device 120, and Beacon(s) 130. In an embodiment, server device 110 and computing device 120 are interconnected over network 102.

Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between server device 110, computing device 120, and any other computer (not shown) connected to network 102, in accordance with embodiments of the present invention.

In an embodiment, computing device 120 and beacon(s) 130 are interconnected over network 104. Network 104 can be, for example, Bluetooth™, Bluetooth™ low energy, near field communication networks, etc., or any combination, and include forms of wireless communications. In general, network 104 can be any combination of connections and protocols that will support communications between computing device 120, beacon(s) 130, and any other computer (not shown) connected to network 104, in accordance with embodiments of the present invention.

In an embodiment, server device 110 may be a laptop, tablet, or netbook personal computer (PC), a desktop computer, a personal digital assistant (PDA), a smart phone, camera, video camera, video device or any programmable electronic device capable of communicating with any computing device within data processing environment 100. In certain embodiments, server device 110 collectively represents a computer system utilizing clustered computers and components (e.g., database server computers, application server computers, etc.) that act as a single pool of seamless resources when accessed by elements of data processing environment 100, such as in a cloud computing environment. In general, server device 110 is representative of any electronic device or combination of electronic devices capable of executing computer readable program instructions. In an embodiment, server device 110 may include components as depicted and described in detail with respect to FIG. 4, in accordance with embodiments of the present invention.

In an embodiment, server device 110 includes load balance program 112 and information repository 114. In an embodiment, load balance program 112 is a program, application, or subprogram of a larger program for the load balancing of transmissions from any number of computing device 120 found in a physical environment. In an embodiment, a physical environment is any physical area (e.g., a home, a condo, a store, an office, etc.) In an alternative embodiment, load balance program 112 may be located on any other device accessible by server device 110 via network 102. In an embodiment, information repository 114 may include load balance information used by load balance program 112 to determine the transmission number for computing device 120. In an embodiment, the load balance information includes, but is not limited to, rules for assigning a transmission number to computing device 120 based on the type of computing device, rules for assigning a transmission number to computing device 120 based on the location of the computing device 120, rules for the initial determining of a transmission number for computing device 120 or rules for reassigning an updated transmission number for computing device 120 based on the utilization of each transmission number, based on the historical length of stay of a device in the physical environment, etc. In an alternative embodiment, information repository 114 may be located on any other device accessible by server device 110 via network 102.

In an embodiment, load balance program 112 may determine a transmission number for a computing device and transmit the determined transmission number to the computing device. In an embodiment, load balance program 112 may receive rules for determining a transmission for a computing device. In an embodiment, load balance program 112 may receive an indication from a computing device requesting a transmission number. In an embodiment, load balance program 112 may determine a transmission number for a computing device using the received rules. In an embodiment, load balance program 112 may transmit the determined transmission number to the computing device. In an embodiment, load balance program 112 may receive an update the transmission number for a computing device based on changes to the physical environment. In an embodiment, load balance program 112 may transmit the updated transmission number to the computing device.

In an embodiment, load balance program 112 may include a user interface that allows a user to interact with load balance program 112. A user interface (not shown) is a program that provides an interface between a user and load balance program 112. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard.

In an embodiment, server device 110 includes information repository 114. In an embodiment, information repository 114 may be managed by load balance program 112. In an alternative embodiment, information repository 114 may be managed by the operating system of server device 110, alone, or together with, load balance program 112. In an embodiment, information repository 114 may include, but is not limited to, rules for assigning a transmission number to computing device 120 based on the type of computing device, rules for assigning a transmission number to computing device 120 based on the location of the computing device 120, rules for assigning a transmission number to a computing device 120 based on a profile of the user of the computing device, rules for assigning a transmission number to a computing device 120 based on the predicted number of beacon(s) 130 the computing device 120 is going to interact with, rules for the initial determining of a transmission number for computing device 120 or reassigning a new transmission number for computing device 120 based on the utilization of each transmission number, etc. In an embodiment, information repository 114 may include information about the transmission window and transmission number. In an embodiment, the transmission window is the total amount of time that transmissions may be sent. For example, the transmission may be 10 seconds. In other words, all devices transmitting notifications to the server device 110 will do so at some time during the transmission window (i.e. 10 seconds). In an embodiment, the transmission number is a number assigned to a specific computing device indicating when that computing device can transmit notifications to the server device. Continuing the previous example, the transmission number may be one second in length and therefore, with a transmission window of 10 seconds there are 10 transmission numbers (i.e. second number one, second number two, etc.) In an embodiment, the transmission number can indicate the start of the transmission. Continuing the previous example, a computing device 120 with transmission number of the first second may transmit notifications to the server device 110 from the beginning of the first second until the end of the first second (i.e. 1.0 to 1.99). In an alternative embodiment, the transmission number can indicate the middle of the transmission. In an alternative example, a computing device 120 with transmission number of the first second may transmit notification to server device 110 a half second before the first second and a half second after the first second (i.e. 0.5 to 1.5). In an embodiment, a computing device 120 starts the transmission of the notifications to server device 110 within the transmission number associated.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

In an embodiment, computing device 120 may be a laptop, tablet, or netbook personal computer (PC), a desktop computer, a personal digital assistant (PDA), a smart phone, camera, video camera, video device or any programmable electronic device capable of communicating with any computing device within data processing environment 100. In general, computing device 120 is representative of any electronic device or combination of electronic devices capable of executing computer readable program instructions. In an embodiment, computing device 120 may include components as depicted and described in detail with respect to FIG. 4, in accordance with embodiments of the present invention. In an embodiment, there may be any number of computing device 120 in data processing environment 100. In an embodiment, computing device 120 may be a smart watch or wearable device. In an example, computing device 120 may be a smart watch of a person as they move throughout a baseball stadium. In another example, computing device 120 may be a mobile device of a customer as the customer moves throughout a retail store.

In an embodiment, computing device 120 includes beacon program 122 and information repository 124. In an embodiment, beacon program 122 is a program, application, or subprogram of a larger program for transmitting notifications based on a transmission number. In an alternative embodiment, beacon program 122 may be located on any other device accessible by computing device 120 via network 102. In an embodiment, information repository 124 may include a transmission number used by beacon program 122 to determine when to transmit notifications received by computing device 120. In an embodiment, the transmission number may be any value that represents a time in a transmission window. For example, the transmission number may be a digit, a time stamp, etc. In an alternative embodiment, information repository 114 may be located on any other device accessible by computing device 120 via network 102.

In an embodiment, beacon program 122 may receive a transmission number for computing device 120 and transmit notifications received by the computing device based on the received transmission number. In an embodiment, beacon program 122 may request a transmission number from load balance program 112. In an embodiment, beacon program 122 may receive a transmission number. In an embodiment, beacon program 122 may receive a notification from beacon(s) 130. In an embodiment, beacon program 122 may determine whether to transmit received notifications based on the transmission number received previously. In an embodiment, beacon program 122 adds the notification to a batch of non-sent notifications if the notification is not transmitted based on the transmission number. In an embodiment, beacon program 122 may transmit all received notifications in the non-sent batch of notifications if beacon program 122 determines to transmit based on the transmission number.

In an embodiment, beacon program 122 may include a user interface that allows a user to interact with beacon program 122. A user interface (not shown) is a program that provides an interface between a user and beacon program 122. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard.

In an embodiment, computing device 120 includes information repository 124. In an embodiment, information repository 124 may be managed by beacon program 122. In an alternative embodiment, information repository 124 may be managed by the operating system of computing device 120, alone, or together with, beacon program 122. In an embodiment, information repository 114 may include, but is not limited to, the transmission number assigned to computing device 120, information about the computing device 120 such as identification information associated with the computing device (i.e., an email address, a phone number, etc.).

Information repository 124 may be implemented using any volatile or non-volatile storage media for storing information, as known in the art. For example, information repository 124 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

In an embodiment, beacon(s) 130 may be one or more device(s) that allows for wireless communication with another computing device. In an embodiment, beacon(s) 130 may be any networking device that forwards data packets to computing devices. In an embodiment, signal device(s) may be any networking device that is part of a wireless personal area network. In certain embodiments, beacon(s) 130 may be a device capable of Bluetooth™ communication that allows computing devices to connect. In certain embodiment, beacon(s) 130 may be include the ability for radio-frequency identification (RFID). In an embodiment, signal device(s) may be a combination of any of the above-referenced technology (e.g., two Wi-Fi devices and a Bluetooth™ device, a Wi-Fi device and two Bluetooth™ devices, etc.) or any other technology known in the art.

Figure 2:
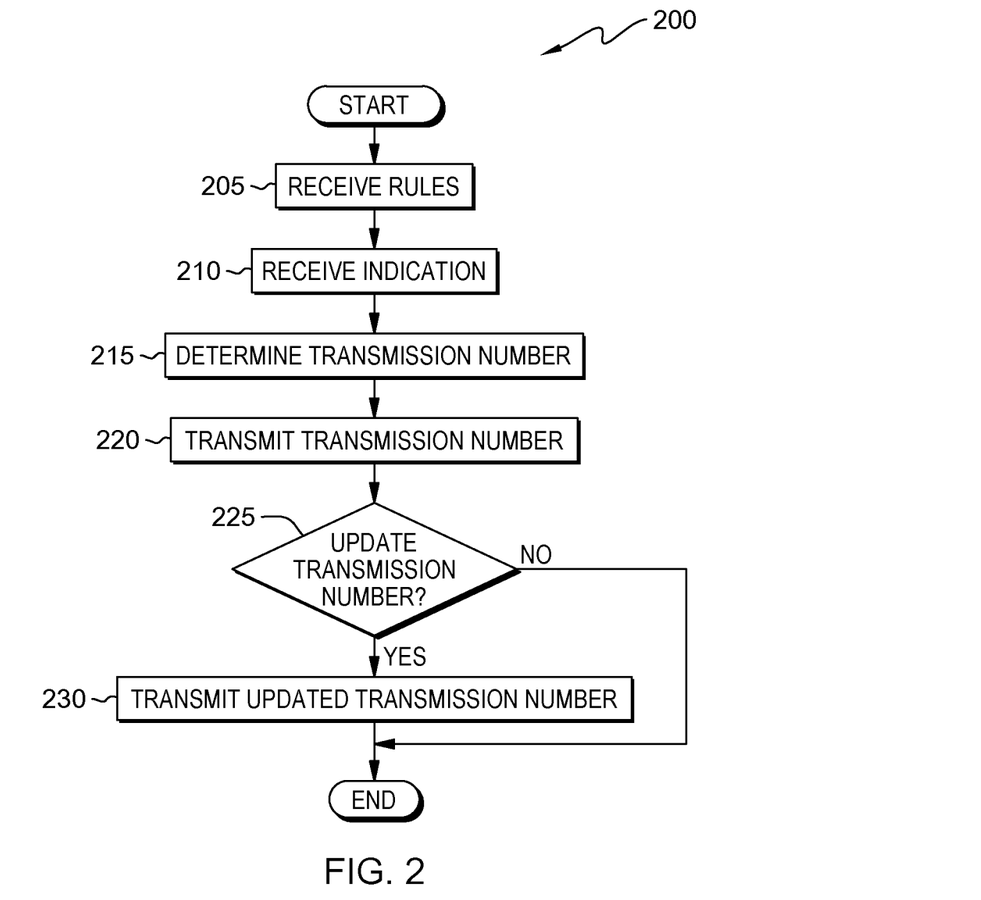
FIG. 2 depicts a flowchart of operational steps of a program for the load balancing of transmissions from any number of computing device found in a physical environment, in accordance with an embodiment of the present invention.

FIG. 2 is a flowchart of workflow 200 depicting operational steps for the load balancing of transmissions from any number of computing device found in a physical environment, in accordance with an embodiment of the present invention. In one embodiment, the steps of the workflow are performed by load balance program 112. In an alternative embodiment, steps of the workflow can be performed by any other program while working with load balance program 112. In an embodiment, workflow 200 can be invoked upon a computing device 120 attempting to transmit a notification to server device 110. In an alternative embodiment, workflow 200 can be invoked upon changes to the physical environment or rules that require a change to the transmission number assigned to a computing device 120.

Load balance program 112 receives rules (step 205). In other words, load balance program 112 rules for determining a transmission number to assign to any computing device that may be found in the physical environment. In an embodiment, the rules may include, but is not limited to, rules for assigning a transmission number to computing device 120 based on the location of the computing device 120, rules for the initial determining of a transmission number for computing device 120 or rules for reassigning a new transmission number for computing device 120 based on the utilization of each transmission number, etc. In an embodiment, the rules may include information about the total length of a transmission window (i.e., 10 milliseconds, 10 thousand milliseconds, 10 seconds, a timeout length of devices, etc.) In an embodiment, the transmission window is the entire window of time that all devices can transmit notifications, however, each device has assigned transmission numbers so each device can only transmit notifications during that transmission number. In an embodiment, transmission numbers are a segment or chunk of the transmission window (i.e. 1 millisecond of the 1000 milliseconds, 1 second of the 10 seconds, 10% of the timeout length of devices, etc.) In an embodiment, load balance program 112 may receive the rules from a user via the GUI discussed previously. In an alternative embodiment, load balance program 112 may retrieve the rules from information repository 114.

In a first example, the physical area may be a baseball park. Continuing with the first example, the transmission window at the baseball park is 10 seconds, the rules for initially assigning the transmission number to a device are that each transmission number (i.e. second number one, second number two, second number three, etc.) should cover 10% of the devices in the physical area, and the rules about reassigning a transmission number is if any transmission number receives covers less than 7% of the devices or more than 13% of the devices in the physical area then the transmission number will be reassigned/updated. In a second example, the physical area may be grocery store. Continuing with the second example, the transmission window at the grocery store is five thousand milliseconds. Here, the rules for initially assigning the transmission number is that the first device to request a transmission number receives the first thousand millisecond transmission number, the second device to request a transmission number receives the second thousand millisecond transmission number, the third device to request a transmission number receives the third thousand millisecond transmission number, the fourth device to request a transmission number receives the fourth thousand millisecond transmission number, and the fifth device to request a transmission number receives the fifth thousand millisecond transmission number. Further, the rules for reassigning the transmission numbers is that all transmission numbers need to have an equal number of devices assigned to the transmission number and if a device leaves so that a transmission number has less devices then another transmission number then a device will be reassigned a transmission number. In the second example, a device can be assigned more than one transmission number so that each transmission number has an equal number of devices assigned to it as compared to other transmission numbers.

Load balance program 112 receives an indication (step 210). In other words, load balance program 112 receives an indication from computing device 120 via network 102. In an embodiment, the indication may be a request for a new transmission number. In an alternative embodiment, the indication may be a request for an updated transmission number. In an embodiment, the indication may be a request for information from server device 110 related to one or more beacon(s) 130 that computing device 120 is within range and load balance program 112 now needs to assign a transmission number to computing device 120. In yet another embodiment, the indication may be that computing device 120 may have entered a physical area covered by server device 110 and therefore computing device 120 will need a transmission number. In the first example, discussed previously, a baseball fan enters the baseball stadium and as he is passing a hot dog vender, a beacon located on the hot dog cart of the hot dog vender sends an indication to the mobile device of the baseball fan. Here, the mobile device of the baseball fan sends the indication to a server device that manages all indications for the baseball stadium and the mobile device requests a transmission number for the mobile device. In the second example, discussed previously, a shopper enters the grocery store and as the shopper passes the threshold of the door of the grocery store, a location system indicates to the mobile device of the shopper that the shopper has entered the grocery store and therefore the mobile device sends an indication to the server device that manages all indications for the shopping center and the mobile device requests a transmission number for the mobile device.

Load balance program 112 determines a transmission number (step 215). In other words, load balance program 112 determines a transmission number for computing device 120 that requested the new transmission number in the previous step based on the rules received previously. In an embodiment, load balance program 112 may determine a single transmission number for computing device 120. In an alternative embodiment, load balance program 112 may determine multiple transmission number for computing device 120. In an embodiment, load balance program 112 may randomly assign a transmission number for computing device 120. Continuing the first example, discussed previously, load balance program 112 determines the transmission number for the mobile device of the baseball fan. Here, load balance program 112 accesses information repository 114 to determine the current transmission number allocation to other computing devices within the baseball park. Load balance program 112 determines the current allocation of transmission numbers is transmission number first second (9%), transmission number second second (11%), and transmission numbers third second through tenth second (10%). Therefore, load balance program 112 determines the transmission number for the mobile device of the fan should be transmission number first second because that is the transmission number with the lowest percentage allotment of devices. Continuing with the second example, discussed previously, load balance program 112 determines the transmission number for the mobile device of the shopper. Here, load balance program 112 accesses information repository 114 to determine the current transmission number allocation to other computing devices within the grocery story. Load balance program 112 determines that no other computing devices have entered the grocery story because the grocery store just opened. Therefore, load balance program 112 determines the transmission number for the mobile device of the shopper should be the first available transmission number, the first thousand millisecond transmission number.

Load balance program 112 transmits the transmission number (step 220). In other words, load balance program 112 transmits the transmission number determined previously to computing device computing device 120. In an embodiment, load balance program 112 transmits the transmission number via network 102. In an embodiment, load balance program 112 stores the transmission number assigned to computing device 120 in information repository 114. Continuing the first example, load balance program 112 transmits the determined transmission number first second to the mobile device of the fan. Continuing the second example, load balance program 112 transmits the determined first thousand millisecond transmission number to the mobile device of the shopper.

Load balance program 112 determines whether to update the transmission number (decision block 225). In other words, load balance program 112 determines whether there have been in any changes to the physical area covered by server device 110. In an embodiment, changes to the physical area may include, but are not limited to, the following: changes to the number of devices assigned to each transmission number, changes to the percentage of allocation of devices on each transmission number, changes to size of the physical area covered by server device 110, changes to performance of server device 110, changes to the location of the computing device 120 within the physical area, based on the historical length of stay of a device in the physical environment, based on the historical usage/performance information for server device 110 in the physical area, etc. If load balance program 112 determines there are changes to the physical area covered by server device 110, load balance program determines an updated transmission number and processing proceeds to step 230. If load balance program 112 determines there are not enough or no changes to the physical area covered by server device 110 so that load balance program does not need to determine an updated transmission number, then processing ends. Continuing with the first example, due to computing devices leaving the physical area, load balance program 112 determines that the current allocation of transmission numbers is transmission number first second (14%), transmission number second second (6%), and transmission numbers third second through tenth second (10%). Because, based on the rules discussed previously, no transmission number should have more than 13% of the allocation of computing devices, load balance program 112 determines that some computing devices with the transmission number first second should be updated to transmission numbers with the transmission number second second. Therefore, load balance program 112 updates the transmission number for mobile device of the baseball fan should be the transmission number second second and load balance program updates information repository 114 accordingly. Continuing with the second example, there have been no changes to the current allocation of transmission numbers for the grocery store and therefore load balance program 112 determines that the transmission numbers should not be updated and no changes are made to information repository 114.

Load balance program 112 transmits the updated transmission number (step 230). In other words, load balance program 112 transmits the updated transmission number determined previously to computing device computing device 120. In an embodiment, load balance program 112 transmits the updated transmission number via network 102. In an embodiment, load balance program 112 stores the updated transmission number assigned to computing device 120 in information repository 114.

Figure 3:
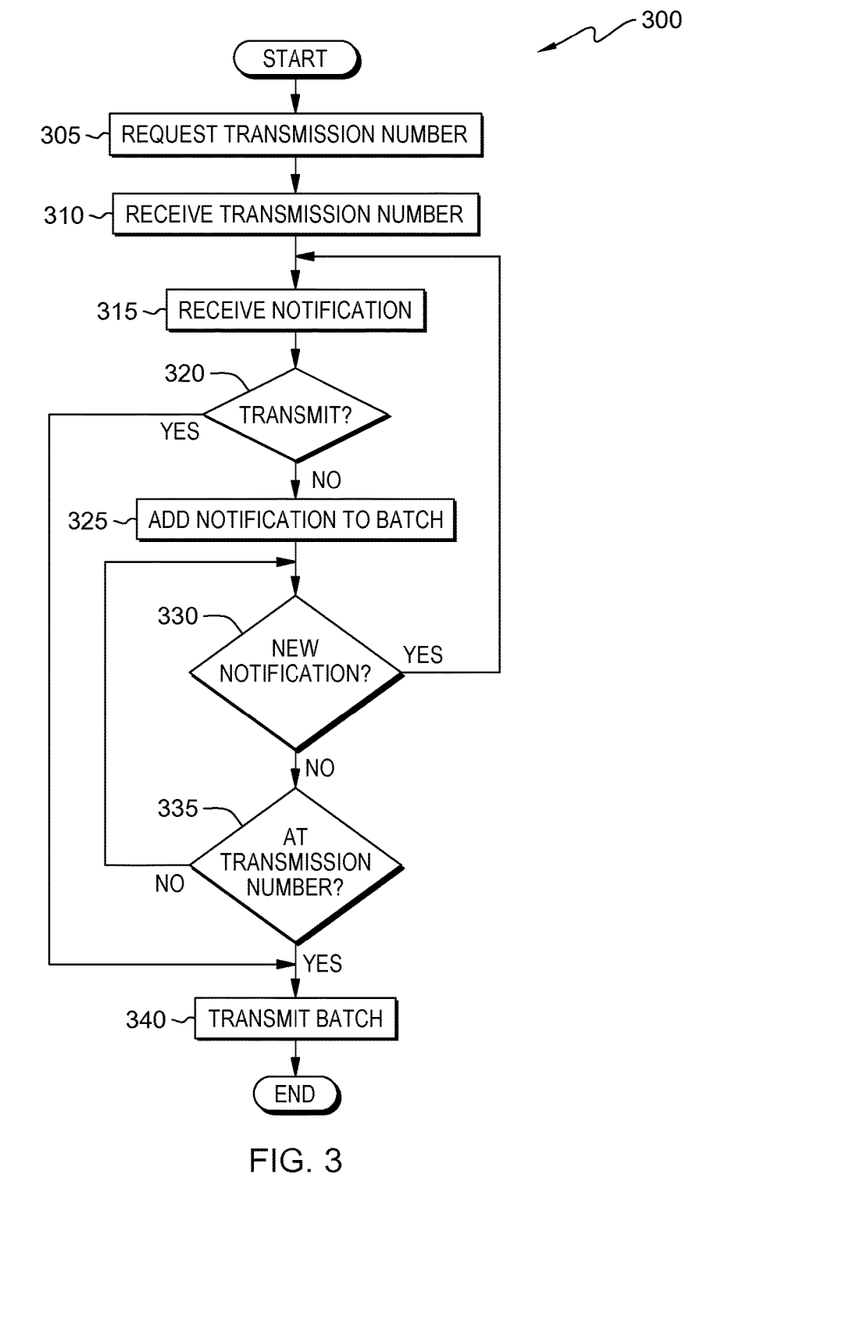
FIG. 3 depicts a flowchart of operational steps of a program for transmitting notifications based on a transmission number, in accordance with an embodiment of the present invention.

FIG. 3 is a flowchart of workflow 300 depicting operational steps for transmitting notifications based on a transmission number. In one embodiment, the steps of the workflow are performed by beacon program 122. In an alternative embodiment, steps of the workflow can be performed by any other program while working with beacon program 122. In an embodiment, a user, via a user interface discussed previously, can invoke workflow 300 upon a user wanting to transmit a received notification on computing device 120 from beacon(s) 130 to server device 110. In an alternative embodiment, workflow 300 can be invoked upon computing device 120 entering a physical area covered by server device 110. In yet another embodiment, workflow 300 can be invoked upon computing device 120 receiving a notification from beacon(s) 130.

Beacon program 122 requests a transmission number (step 305). In other words, beacon program 122 requests a transmission number for computing device 120 from load balance program 112 on server device 110 via network 102. In an embodiment, beacon program 122 may request a transmission number from load balance program 112 upon computing device 120 receiving an indication from one or more beacon(s) 130. In an alternative embodiment, beacon program may request a transmission number from load balance program 112 upon computing device 120 entering a physical area that is covered by server device 110 and another computing device (not shown, such as a global positioning system or Wi-Fi triangulation location system) indicating to load balance program 112 that computing device is in a physical area covered by server device 110. In yet another embodiment, beacon program 122 may request an updated transmission number after a period of time of using a previously received transmission number (i.e. an expiration of an already received transmission number). In the first example, discussed previously, a baseball fan enters the baseball stadium and as he is passing a hot dog vender, a beacon located on the hot dog cart of the hot dog vender sends an indication to the mobile device of the baseball fan. Here, the mobile device of the baseball fan sends the indication to a server device that manages all indications for the baseball stadium and the mobile device requests a transmission number for the mobile device. In the second example, discussed previously, a shopper enters the grocery store and as the shopper passes the threshold of the door, a location system indicates to the mobile device of the shopper that the shopper has entered the grocery store and therefore mobile device requests a transmission number for the mobile device.

Beacon program 122 receives a transmission number (step 310). In other words, beacon program 122 receives a transmission number from server device 110 and load balance program 112. In an embodiment, beacon program 122 stores the received transmission number in information repository 124. Continuing the first example, beacon program 122 receives determined transmission number first second to the mobile device of the fan and stores the determined transmission number on the mobile device of the fan. Continuing the second example, beacon program 122 receives the determined first thousand millisecond transmission number to the mobile device of the shopper and stores the determined transmission number on the mobile device.

Beacon program 122 receives a notification (step 315). In other words, beacon program 122 receives a notification from at least one of the beacon(s) 130 via network 104. In an embodiment, the notification may be in the form of a universally unique identifier (UUID). A UUID is an identifier standard used in software construction that may be a 128-bit value and the meaning of each bit is defined by any of several variants. In an embodiment, the notification may include a major number, a minor number, and a TX power level in 2's compliment, as known in the art. In an embodiment, the notification may include any number of hex data. In an embodiment, the notification may be in any form that identifies, to beacon program 122, the beacon(s) 130 that are transmitting the notification that beacon program 122 receives. In the first example, discussed previously, a baseball fan enters the baseball stadium and as he is passing a hot dog vender, a beacon located on the hot dog cart of the hot dog vender sends an indication to the mobile device of the baseball fan. In the second example, discussed previously, a shopper enters the grocery store and as the shopper enters aisle three, a beacon located in aisle three sends an indication to the mobile device of the shopper.

Beacon program 122 determines whether to transmit (decision block 320). In other words, beacon program 122 determines whether to transmit all previously received notifications that have not been sent to server device 110 based on the transmission number for computing device 120. In an embodiment, beacon program 122 determines if the current time span in the total transmission window is at the transmission number assigned to computing device 120. In other words, a total transmission window, as discussed previously, exists for the server device 110. Beacon program 122 determines whether the current time in the total transmission window is at a transmission number was received previously and assigned to computing device 120. Beacon program 122 determines this by comparing the current timestamp at the time to transmit to the transmission window time. The transmission window time on computing device 120 is synched with the server device 110. In other words, the server device 110 has a clock that indicates the time window and when this time window starts and computing device 120 has a clock that synchs with the clock of the server device 110 so that the time window on the computing device matches the server device. Computing device 120 can then use the synched time window to determine whether the timestamp at the time to transmit is within the transmission number assigned to computing device 120. In an alternative embodiment, clocks can be synched between server device 110 and computing device 120 using a "seed" time or an "offset". The "seed" time or "offset" is a period of time that is added or removed from the internal clock of the computing device 120 to make the internal clock plus or minus the "seed" time or "offset" equal to the internal clock of the server device.

In the first example, discussed previously, server device covering the baseball stadium has a transmission window of 10 seconds. Here, the baseball fan receives the indication on his mobile device from the beacon located on the hot dog cart at the fourth second of ten second window. Beacon program 122 determines not to transmit the notification to the server device because the transmission number of the mobile device of the baseball fan is the first second and currently, beacon program 122 is at the fourth second of the ten second window. In the second example, discussed previously, server device covering the shopping center has a transmission window of five thousand milliseconds. Here, the shopper receives the indication on their mobile device from the beacon located in aisle three at the first thousand millisecond of the five thousand millisecond window. Beacon program 122 determines to transmit the notification to the server device the transmission number of the mobile device of the shopper is the first thousand millisecond and the currently, beacon program 122 is at the first thousand millisecond of the five thousand millisecond window.

If it is determined that it is not time to transmit (decision block 320, no branch), beacon program 122 adds the notification to a batch of notifications (step 325). In other words, beacon program 122 adds the received notification to a batch of notifications. In an embodiment, the received notification may be the first notification that is waiting to be sent when the transmission number for computing device 120 occurs. In an alternative embodiment, the received notification may be added to a batch of already received notifications that have not been sent yet and are waiting to be sent when the transmission number for computing device 120 occurs. In an embodiment, the notifications are stored in information repository 124. In an embodiment, the batch of received notifications that have not been sent yet are stored in information repository 124. In the first example, discussed previously, beacon program 122 determines that it is not time to transmit the notification received by the mobile device of the baseball fan, therefore, beacon program 122 adds the notification to information repository 124 found on the mobile device of the baseball fan. Here, the notification is added to a batch of notifications previously received and not previously sent to server device 110.

Beacon program 122 determines whether there is a new notification (decision block 330). In other words, beacon program 122 determines whether computing device 120 receives a notification from at least one of the beacon(s) 130 via network 104. If beacon program 122 determines that computing device 120 receives a notification from at least one of the beacon(s) 130 via network 104 (decision block 330, yes branch), beacon program 122 receives a notification (step 315).

If beacon program 122 determines that computing device 120 does not receive a notification from at least one of the beacon(s) 130 via network 104 (decision block 330, no branch), beacon program 122 determines whether the time is at the transmission number (decision block 335). In other words, beacon program 122 determines whether to transmit all previously received notifications that have not been sent to server device 110 based on the transmission number for computing device 120. Similar to decision block 320, beacon program 122 determines if the current time span in the total transmission window is at the transmission number assigned to computing device 120. If beacon program 122 determines that it is time to transmit based on the time being at the transmission window (decision block 335, yes branch), beacon program 122 transmits the batch of received notifications that have not been transmitted yet (step 340), as discussed below.

If it is determined that it is time to transmit (decision block 320, yes branch), beacon program 122 transmits the batch of received notifications that have not been transmitted yet (step 340). In other words, beacon program 122 transmits all received notifications, at the time of beginning of the transmission, that have not been previously sent to server device 110 via network 102. Server device 110 includes a program (not shown) to handle received notifications and handle them accordingly, as known in the art. In the second example, discussed previously, beacon program 122 determines that is it time to transmit the notification received by the mobile device of the shopper, therefore, beacon program 122 transmits the notification to the server device that covers the physical area of the grocery store. In an embodiment, if a transmission fails, beacon program 122 will attempt to transmit all received notifications in the batch when the transmission number next occurs.

Figure 4:
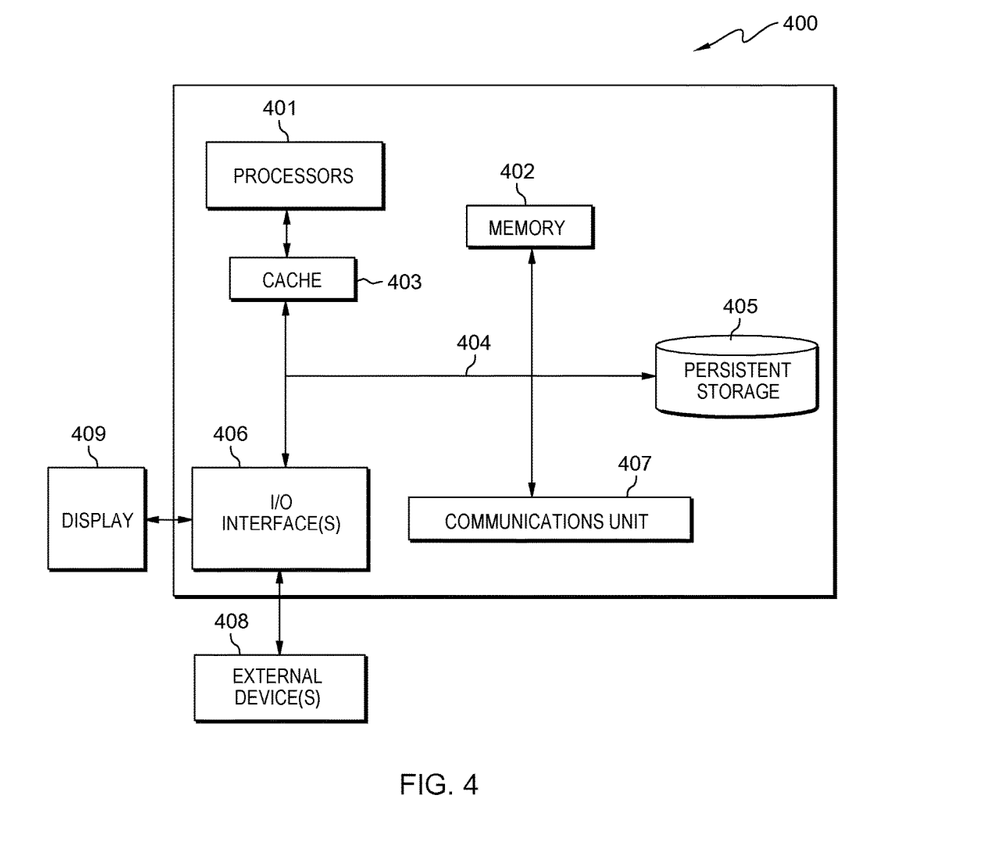
FIG. 4 depicts a block diagram of components of the computer of FIG. 1, in accordance with an embodiment of the present invention.

FIG. 4 depicts computer system 400, which is an example of a system that includes load balance program 112 or beacon program 122. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for load balancing of transmissions from any number of computing devices found in a physical environment, the method comprising:
   receiving, by a communications unit, a set of rules for assigning transmission numbers to a plurality of computing devices each configured to transmit received beacon notifications, wherein the transmission numbers are numbers which indicate when the plurality of computing devices can transmit the received beacon notifications within a corresponding portion of a transmission window and wherein the set of rules for assigning transmission numbers includes a rule that the transmission numbers be assigned such that each transmission number has an approximately equal number of computing devices assigned to it;
   receiving, by the communications unit, an indication from each of the plurality of computing devices, wherein the indication includes a request for a transmission number;
   determining, by one or more computer processors, the transmission numbers for the plurality of computing devices using the set of rules and the transmission window;
   transmitting, by the communications unit, the transmission numbers to the plurality of computing devices;
   receiving, by the communications unit, two or more beacon notification transmissions from each of the plurality of computing devices during the corresponding portion of the transmission window, each of the plurality of computing devices having batched the two or more beacon notification transmissions to send according to the transmission number; and
   determining, by one or more computer processors, to update a transmission number for a first computing device of the plurality of computing devices based on the set of rules, wherein the physical environment is a physical area and wherein the determining is based on determining there have been one or more changes to the physical area including changes to performance of a server device containing the communications unit.

2. The method of claim 1, wherein the set of rules consists of rules for assigning the transmission numbers based on respective locations of the plurality of computing devices.

3. The method of claim 1, wherein determining, by one or more computer processors, a transmission number for a first computing device of the plurality of computing devices using the set of rules and the transmission window comprises:
   determining, by one or more computer processors, a current allocation of the transmission numbers to the plurality of computing devices;
   determining, by one or more computer processors, a first transmission number of the transmission numbers with a lowest non-zero allocation; and determining, by one or more computer processors, the first transmission number is the transmission number for the first computing device.

4. The method of claim 1, wherein determining, by one or more computer processors, a transmission number for a first computing device of the plurality of computing devices using the set of rules and the transmission window comprises:
determining, by one or more computer processors, a last transmission number that was last assigned to any computing device;
determining, by one or more computer processors, a next transmission number after the last transmission number; and
determining, by one or more computer processors, the next transmission number is the transmission number for the first computing device.

5. The method of claim 1, further comprising:
determining, by one or more computer processors, whether to update a transmission number for a first computing device of the plurality of computing devices based on the set of rules;
responsive to determining to update the transmission number for the first computing device based on the set of rules, updating, by one or more computer processors, the transmission number for the first computing device using the set of rules and the transmission window; and
transmitting, by the communications unit, the updated transmission number to the first computing device.

6. The method of claim 5, wherein the physical environment is a physical area; and
wherein determining, by one or more computer processors, whether to update the transmission number for the first computing device based on the set of rules comprises:
determining, by one or more computer processors, there have been one or more changes to size of the physical area.

7. The method of claim 1, wherein the receiving of the indication from each of the plurality of computing devices, the transmitting the transmission numbers, and the receiving the transmissions are performed using Bluetooth™.

8. The method of claim 1, wherein the set of rules consists of rules for assigning the transmission numbers based on respective predicted numbers of beacons each of the plurality of computing devices will interact with.

9. The method of claim 1, wherein the set of rules for assigning transmission numbers is received from a user via a graphical user interface.

10. The method of claim 1, wherein the received beacon notifications are universally unique identifiers that identify beacons transmitting to the plurality of computing devices.

11. A computer program product for load balancing of transmission from any number of computing devices found in a physical environment, the computer program product comprising:
one or more computer readable storage media; and
program instructions stored on the one or more computer readable storage media, the program instructions comprising:
program instructions to receive, by a communications unit, a set of rules for assigning transmission numbers to a plurality of computing devices each configured to transmit received beacon notifications, wherein the transmission numbers are numbers which indicate when the plurality of computing devices can transmit the received beacon notifications within a corresponding portion of a transmission window and wherein the set of rules for assigning transmission numbers includes a rule that the transmission numbers be assigned such that each transmission number has an approximately equal number of computing devices assigned to it;
program instructions to receive, by the communications unit, an indication from each of the plurality of computing devices, wherein the indication includes a request for a transmission number;
program instructions to determine, by one or more computer processors, the transmission numbers for the plurality of computing devices using the set of rules and the transmission window;
program instructions to transmit, by the communications unit, the transmission numbers to the plurality of computing devices;
program instructions to receive, by the communications unit, two or more beacon notification transmissions from each of the plurality of computing devices during the corresponding portion of the transmission window, each of the plurality of computing devices having batched the two or more beacon notification transmissions to send according to the transmission number; and
program instructions to determine, by one or more computer processors, to update a transmission number for a first computing device of the plurality of computing devices based on the set of rules, wherein the physical environment is a physical area and wherein the determining is based on determining there have been one or more changes to the physical area including changes to performance of a server device containing the communications unit.

12. The computer program product of claim 11, wherein the set of rules consists of rules for assigning the transmission numbers based on a historical length of stay of each of the plurality of computing devices.

13. The computer program product of claim 11, wherein the program instructions to determine a transmission number for a first computing device of the plurality of computing devices using the set of rules and the transmission window comprises:
program instructions to determine a current allocation of transmission numbers to the plurality of computing devices;
program instructions to determine a first transmission number of the transmission numbers with a lowest non-zero allocation; and
program instructions to determine the first transmission number is the transmission number for the first computing device.

14. The computer program product of claim 11, further comprising program instructions stored on the one or more computer readable storage media, the program instructions to:
determine whether to update a transmission number for a first computing device of the plurality of computing devices based on the set of rules;
responsive to determining to update the transmission number for the first computing device based on the set of rules, to update the transmission number for the first computing device using the set of rules and a transmission window; and
transmit, by the communications unit, the updated transmission number to the first computing device.

15. The computer program product of claim 14, wherein the physical environment is a physical area; and
wherein the program instructions to determine whether to update the transmission number for the first computing device based on the set of rules comprises:
program instructions to determine there have been one or more changes to size of the physical area.

16. A computer system for load balancing of transmission from any number of computing devices found in a physical environment, the computer system comprising:
one or more computer processors;
one or more computer readable storage media;
a communications unit; and
program instructions stored on the one or more computer readable storage media for execution by at least one of the one or more computer processors, the program instructions comprising:
program instructions to receive, by the communications unit, a set of rules for assigning transmission numbers to a plurality of computing devices each configured to transmit received beacon notifications, wherein the transmission numbers are numbers which indicate when the plurality of computing devices can transmit the received beacon notifications within a corresponding portion of a transmission window and wherein the set of rules for assigning transmission numbers includes a rule that the transmission numbers be assigned such that each transmission number has an approximately equal number of computing devices assigned to it;
program instructions to receive, by the communications unit, an indication from each of the plurality of computing devices, wherein the indication includes a request for a transmission number;
program instructions to determine, by the one or more computer processors, the transmission numbers for the plurality of computing devices using the set of rules and the transmission window;
program instructions to transmit, by the communications unit, the transmission numbers to the plurality of computing devices;
program instructions to receive, by the communications unit, two or more beacon notification transmissions from each of the plurality of computing devices during the corresponding portion of the transmission window, each of the plurality of computing devices having batched the two or more beacon notification transmissions to send according to the transmission number; and
program instructions to determine, by the one or more computer processors, to update a transmission number for a first computing device of the plurality of computing devices based on the set of rules, wherein the physical environment is a physical area and wherein the determining is based on determining there have been one or more changes to the physical area including changes to performance of a server device containing the communications unit.

17. The computer system of claim 16, wherein the set of rules includes rules for reassigning updated transmission numbers based on the number or percentage of computing devices assigned to each transmission number, wherein the number or percentage is not zero.

18. The computer system of claim 16, wherein the program instructions to determine a transmission number for a first computing device of the plurality of computing devices using the set of rules and the transmission window comprises:
program instructions to determine a current allocation of transmission numbers to the plurality of computing devices;
program instructions to determine a first transmission number of the transmission numbers with a lowest non-zero allocation; and
program instructions to determine the first transmission number is the transmission number for the first computing device.

19. The computer system of claim 16, further comprising program instructions stored on the one or more computer readable storage media for execution by at least one of the one or more computer processors, the program instructions to:
determine whether to update a transmission number for a first computing device of the plurality of computing devices based on the set of rules;
responsive to determining to update the transmission number for the first computing device based on the set of rules, to update the transmission number for the first computing device using the set of rules and a transmission window; and
transmit, by the communications unit, the updated transmission number to the first computing device.

* * * * *